(12) United States Patent
Edwards et al.

(10) Patent No.: US 11,095,958 B2
(45) Date of Patent: Aug. 17, 2021

(54) SYSTEMS AND METHODS OF UNIVERSAL VIDEO EMBEDDING

(71) Applicant: Clipkick, Inc., Los Angeles, CA (US)

(72) Inventors: Alan Edwards, Los Angeles, CA (US); Milan Mendpara, Gujarat (IN)

(73) Assignee: Clipkick, Inc., Venice, CA (US)

( * ) Notice: Subject to any disclaimer, the term of this patent is extended or adjusted under 35 U.S.C. 154(b) by 304 days.

(21) Appl. No.: 16/383,545

(22) Filed: Apr. 12, 2019

(65) Prior Publication Data
US 2020/0329285 A1 Oct. 15, 2020

(51) Int. Cl.
*G06F 15/16* (2006.01)
*H04N 21/858* (2011.01)
*H04N 21/234* (2011.01)
*H04N 21/236* (2011.01)
*G06F 16/00* (2019.01)
*H04L 29/06* (2006.01)
*G06F 16/955* (2019.01)
*G06F 16/93* (2019.01)

(52) U.S. Cl.
CPC ......... *H04N 21/8586* (2013.01); *G06F 16/00* (2019.01); *H04L 65/60* (2013.01); *H04N 21/236* (2013.01); *H04N 21/23424* (2013.01); *G06F 16/94* (2019.01); *G06F 16/955* (2019.01)

(58) Field of Classification Search
CPC ............ H04N 21/8586; H04N 21/4782; H04L 65/60; G06F 16/00
See application file for complete search history.

(56) References Cited

U.S. PATENT DOCUMENTS

| | | | |
|---|---|---|---|
| 8,745,484 B2* | 6/2014 | Roberts | G06F 16/9577 715/234 |
| 8,745,647 B1* | 6/2014 | Shin | H04N 21/812 725/9 |
| 8,812,956 B1* | 8/2014 | Rosenbaum | G06F 3/0484 715/716 |
| 10,708,391 B1* | 7/2020 | Manj | H04L 65/604 |

(Continued)

OTHER PUBLICATIONS https://www.mediawiki.org/wiki/Extension:EmbedVideo; MediaWiki; Extension:EmbedVideo; Apr. 16, 2019; downloaded on Apr. 17, 2019.

(Continued)

*Primary Examiner* — Hieu T Hoang
(74) *Attorney, Agent, or Firm* — Lynch LLP

(57) ABSTRACT

Systems and methods described in this application are directed to universal online video embedding through a single platform. Videos are stored all over the internet in all kinds of different formats across a wide variety of video platforms, websites, and video publishers that makes video content available online. Systems and methods of the inventive subject matter facilitate handling and embedding of videos from any number of different video sources through a single platform by, for example: initializing known video platforms having available APIs or SDKs to streamline embedding of those videos, and, in the absence of an API or SDK, the service platform can go through several steps to determine how best to present the video to a client, whether that involves embedding the video or executing a callback to cause an end-user application to open a webpage URL in a web browser to access the video.

25 Claims, 2 Drawing Sheets

(56) References Cited

U.S. PATENT DOCUMENTS

| | | | | |
|---|---|---|---|---|
| 2002/0120790 A1* | 8/2002 | Schwalb | ............... | H04N 21/435 719/328 |
| 2008/0052630 A1* | 2/2008 | Rosenbaum | ........ | G06F 16/7867 715/738 |
| 2008/0222199 A1* | 9/2008 | Tiu | ........................ | G06F 40/143 |
| 2009/0094525 A1* | 4/2009 | Coelius | ................... | G06Q 10/00 715/741 |
| 2012/0110429 A1* | 5/2012 | Tzonis | ................... | G06Q 10/10 715/230 |
| 2013/0036201 A1* | 2/2013 | McLaughlin | ........... | H04L 65/60 709/219 |
| 2013/0074131 A1* | 3/2013 | Cerveau | ................ | G06F 9/45529 725/88 |
| 2014/0006930 A1* | 1/2014 | Hollis | ................... | G06F 3/0482 715/234 |
| 2014/0122601 A1* | 5/2014 | Poston | ............... | H04N 21/4307 709/204 |
| 2014/0372891 A1* | 12/2014 | Winters | ............. | H04N 21/8113 715/722 |
| 2015/0012616 A1* | 1/2015 | Pearl | .................... | G06Q 10/101 709/219 |
| 2016/0149956 A1* | 5/2016 | Birnbaum | ............. | H04L 63/101 726/1 |
| 2016/0212487 A1* | 7/2016 | Rao | .................. | H04N 21/47205 |
| 2018/0315096 A1* | 11/2018 | Lewis | ................ | G06Q 30/0272 |

OTHER PUBLICATIONS http://playerjs.io/; downloaded Apr. 12, 2019.
www.videojs.com; downloaded Apr. 12, 2019.
https://docs.videojs.com/tutorial-faq.html#q-what-is-videojs; downloaded Apr. 12, 2019.

* cited by examiner

SYSTEMS AND METHODS OF UNIVERSAL VIDEO EMBEDDING

FIELD OF THE INVENTION

The field of the invention is online video embedding and playback systems and methods.

BACKGROUND

The background description includes information that may be useful in understanding the present invention. It is not an admission that any of the information provided in this application is prior art or relevant to the presently claimed invention, or that any publication specifically or implicitly referenced is prior art.

Online video distribution on the Internet has experienced explosive growth since the first video was embedded on a web page for a viewer to play on their desktop computer. With the proliferation of high-bandwidth Internet connections that are accessible to increasing numbers of people, billions of viewers are now able to access and play videos from countless different sources on myriad devices. In addition to desktop computers, Internet-connected devices that can play videos include laptops, tablets, mobile phones, OTT (Over the top Television, sometimes called Internet connected Televisions or "smart TVs") smart watches, automobile infotainment systems, voice controlled personal assistance devices, smart home hubs, etc.

In the early stages of video distribution over the Internet, a video "file" was saved on a server and could be accessed only by accessing that server and opening the video file for playback. But today, video sources now include user-generated video portals like YouTube, Vimeo, social platforms like Facebook and Instagram, publisher websites (e.g., CBS, NBC, Comedy Central), online cloud services (e.g., Dropbox, Box, iCloud), and personal blogs, etc.

When video files were first played over the Internet, a video player was embedded on an HTML page by the publisher that, when activated, would call the video file and render it for the viewer. This early system was sufficient for web publishers to display videos on their web pages, but modern video platforms like YouTube allowed users to upload videos directly to the platform, which could then generate embed code to give the user the ability to easily embed their uploaded video on any website. With embedded video, when a visitor navigates to a webpage having embedded video, the embed code calls the third-party server and delivers the video seamlessly.

Next, with the proliferation of mobile devices, OTT, and other standalone Internet connected devices, APIs (Application Programming Interfaces) and SDKs (Software Developer Kits) were developed by many video platforms to help developers integrate videos from those platforms into their applications more efficiently while delivering better user experiences.

Today, when developers embed videos from third-party sources, they have to configure their web pages or applications to account for the source of the video, which can have complex playback requirements and methods. As more and more video sources and embedding methods become available, a number of scripts have been developed to handle different methods—and also to add playback features like progress bars—to help publishers embed videos more easily and with better user experiences. Though these scripts help publishers present videos over the Internet, they were designed for the configuring and embedding of videos from one video source onto one particular web page in a browser or device application. These solutions fail to consider advantages that can be realized by a platform capable of streamlining video playback from virtually any video source, all within a single application or webpage. Although aggregation solutions do exist, these previously contemplated systems fail to consider more streamlined solutions that implement a controller that is initialized to handle any number of different video sources.

With the availability of video content from so many different sources and configurations, and with a need to playback that video content on an ever-increasing variety of devices, there is a need for systems and methods directed to playing videos from different sources when those videos are shown in the same area of a web page or application. Thus, having a controller to properly configure the delivery and embedding of videos from an unlimited variety of sources on the same web page or application across a variety of devices, while maintaining an ability to change video sources in real time would be necessary to accomplish this task.

Thus, there is still a need in the art for systems and methods directed to universal video embedding across a variety of devices from a variety of video platforms.

SUMMARY OF THE INVENTION

The present invention provides apparatuses, systems, and methods directed to embedding and causing playback of online videos from disparate sources. In one aspect of the inventive subject matter, a method of embedding online videos from multiple sources is contemplated, the method comprising the steps of: storing, in a database on a server, video metadata associated with a video stored on a remote server, wherein the video metadata comprises an input URL that points to the video; sending, to a client, a video listing comprising the video metadata; receiving, at the server, a video selection from the client, the video selection comprising the input URL; determining, by the server, a video platform corresponding to the input URL (e.g., by identifying a platform associated with the input URL); and determining, by the server and according to the video platform, whether to embed the video according to embedding instructions associated with the video platform.

In some embodiments, methods can additionally include the step of determining, by the server, whether the video platform has an associated API or SDK. If an associated API or SDK exists, then the additional step of loading the video into a frame and inserting the frame into HTML body code to be rendered for playback by the client using the associated API or SDK can be included.

Some embodiments include the additional step of loading the video in an HTML5 player and inserting that player into the HTML body to be rendered for playback by the client. In some embodiments, the step of identifying the video platform also includes identifying a domain in the input URL that is associated with the video platform. In some embodiments, the method also includes the step of testing the input URL for a URL error, and if an error exists, then the step of executing a callback to return the input URL to the client so the client can open the input URL in a web browser is also included.

In another aspect of the inventive subject matter, a universal online video embedding system is contemplated, comprising: a server having executable code stored to internal memory, the executable code configured to, upon execution, cause the server to be configured to carry out several functions. Upon executing the code, the server is configured to: store, in a database on the server, video metadata associated with a video stored on a remote server, wherein the video metadata comprises an input URL that points to the video; send, to a client, a video listing comprising the video metadata; receive a video selection from the client, the video selection comprising the input URL; determine a video platform corresponding to the input URL; determine, based on the video platform, whether the video platform has an associated API or SDK before loading the video into a frame and inserting the frame into HTML body code to be rendered for playback by the client using the associated API or SDK; and determine, based on the input URL, whether the video is embeddable before either (1) loading the video in an HTML5 player and inserting that player into the HTML body to be rendered for playback by the client or (2) loading the video in a second frame and inserting the second frame into HTML body to be rendered for playback by the client.

In some embodiments, the executable code is further configured to cause the server to determine the video platform by identifying a platform associated with the input URL. In some embodiments, the executable code is further configured to cause the server to identify the video platform by identifying a domain in the input URL that is associated with the video platform.

In some embodiments, the executable code is further configured to cause the server to test the input URL for a URL error, and if a URL error is discovered, then the server can execute a callback to return the input URL to the client so the client can open the input URL in a web browser.

In another aspect of the inventive subject matter, a method of embedding online videos from multiple sources is contemplated, the method comprising the steps of: storing, in a database on the server, video metadata associated with a video stored on a remote server, wherein the video metadata comprises an input URL that points to the video; sending, to a client, a video listing comprising the video metadata; receiving a video selection from the client, the video selection comprising the input URL; determining a video platform corresponding to the input URL; and executing software code stored to internal memory on the server to configure the server to: determine, based on the video platform, whether the video platform has an associated API or SDK before loading the video into a frame and inserting the frame into HTML body code to be rendered for playback by the client using the associated API or SDK; determine, based on the input URL, whether the video is embeddable before either (1) loading the video in an HTML5 player and inserting that player into the HTML body to be rendered for playback by the client or (2) loading the video in a second frame and inserting the second frame into HTML body to be rendered for playback by the client.

In some embodiments, the method further comprises the step of determining the video platform by identifying a platform associated with the input URL. Methods of the inventive subject matter can additional include the stop of identifying the platform by identifying a domain in the input URL that is associated with the platform.

One should appreciate that the disclosed subject matter provides many advantageous technical effects including facilitating the handling, embedding, and ultimate playback of videos from a wide variety of video platforms, websites, and publishers.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
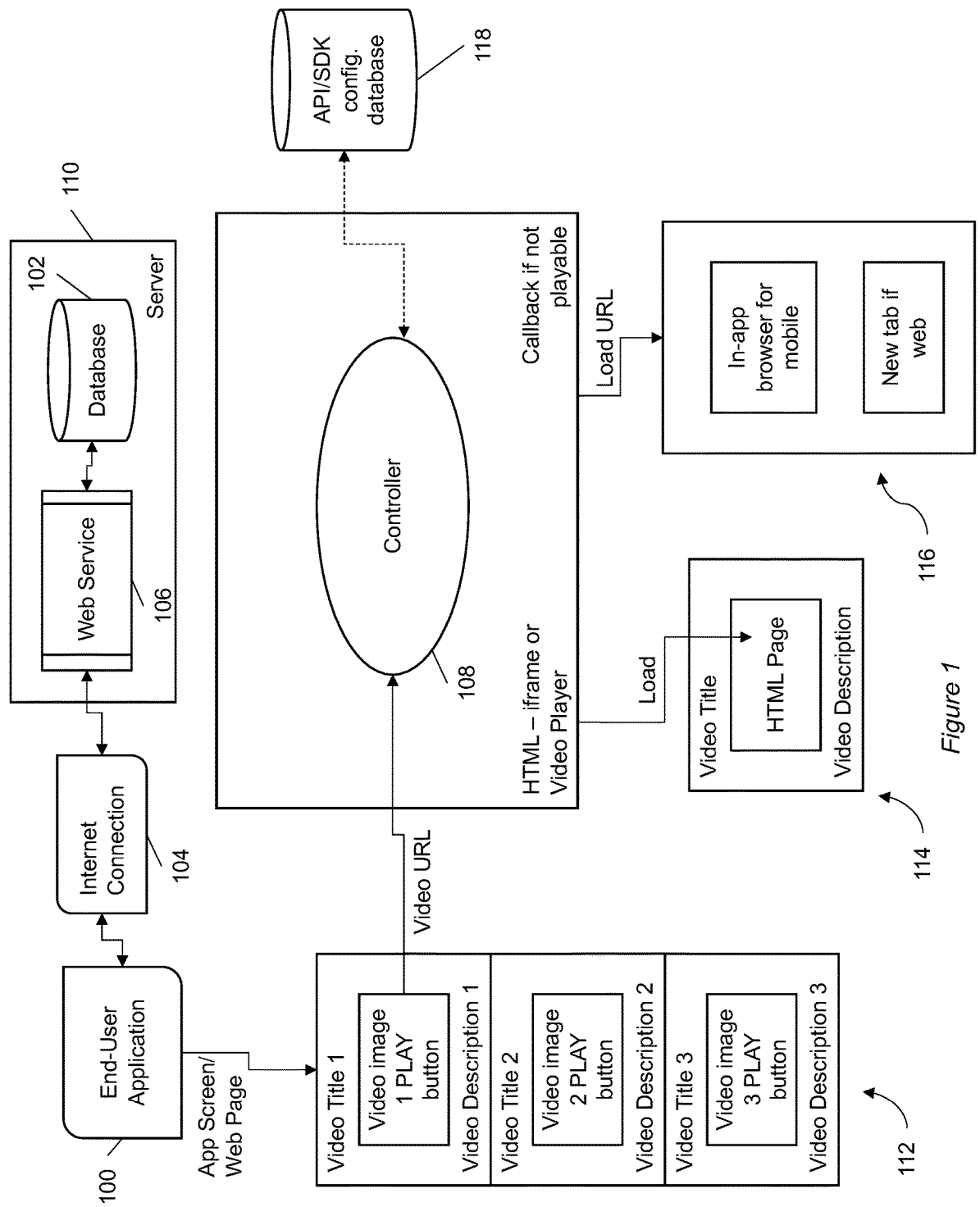
FIG. 1 is a flowchart showing how an end-user application can make a video selection to display a video.

The following discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As used in the description in this application and throughout the claims that follow, the meaning of "a," "an," and "the" includes plural reference unless the context clearly dictates otherwise. Also, as used in the description in this application, the meaning of "in" includes "in" and "on" unless the context clearly dictates otherwise.

Also, as used in this application, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be noted that any language directed to a computer should be read to include any suitable combination of computing devices, including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network. The following description includes information that may be useful in understanding the present invention. It is not an admission that any of the information provided in this application is prior art or relevant to the presently claimed invention, or that any publication specifically or implicitly referenced is prior art.

The inventive subject matter is directed to systems and methods involved in online video embedding. Systems and methods of the inventive subject matter can identify a video source from an input URL and then, depending on the video source and availability of an API or SDK associated with that video source, the service platform can cause that video to be either embedded or played back to a user using an API/SDK, an application, a web browser, or other means.

The controller can thus ensure that a video's original aspect ratio is maintained to facilitate fitting a third-party video into a playback window without affecting the video's aspect ratio and without any portion of the video being visually cut off (e.g., by appearing off screen because the video is too big to fit into the visible area of a screen). In some instances, when a video is not full screen and does not fill an entire space dedicated for a video (e.g., Twitter videos have an odd aspect ratio resulting in unused space on either side of a video), the controller can fill in that unused space with a color, pattern, or image to match the video's surrounding in the presenting space. It is also contemplated that videos of the inventive subject matter can be expanded to be full screen, or even expanded so that the video—without being full screen—fits one or both dimensions of a visible area of a screen (e.g., both height and width).

Systems and methods of the inventive subject matter also facilitate embedding of videos from unlimited sources on an end-user application (e.g., a website, an app, an OTT system, etc.). The term "service platform" in this application refers to implementations of the inventive subject matter as a platform that users can access and use to watch embedded videos. Users access the service platform to access online video content, and the service platform, e.g., coordinates access to video content and determines how best to present that video content to users.

FIG. 1 shows how an end-user application 100 can access a database 102 over an internet connection 104 to present to a user a visual listing of video content. The user can select a video, and a controller 108 can then determine how best to present that video to the user, based on, e.g., the video's source (e.g., YouTube, Facebook, Vimeo, direct video link, etc.). An end-user application 100 (e.g., an app, a website, or an over the top (OTT) system) can run on a mobile device, a television, a computer, a smart home hub, an infotainment system in a vehicle, or any other electronic device with an internet connection and an ability to display video. Over the top (OTT) refers to content providers that distribute streaming media as a standalone product directly to viewers over the Internet, bypassing telecommunications, multichannel television, and broadcast television platforms that traditionally act as a controller or distributor of such content.

In embodiments of the inventive subject matter, the end-user application 100 has access to a database 102. A user's device running the end-user application 100 can access the database 102 via an internet connection 104. Through the internet connection 104, the end-user application 100 allows the user to communicate with one or more web services 106, where the one or more web services 106 is configured to access the database 102. In some embodiments, the end-user application 100 can directly access the database 102 without going through a web service.

The database 102 (which is maintained by the service platform) stores, among other things, video metadata without storing actual video files. Video metadata can include information relating to remotely stored video content including, e.g., a video ID, a webpage URL, a video source (which can be a video source URL or an embed URL), a title, an image (e.g., a cover image, a still image from the video, etc.), a description, a manual category (e.g., a manually-set category), a predicted category (e.g., an algorithmically-set category), a prediction score (e.g., a score in percent that indicates predicted category confidence), one or more keywords associated with a video, and so on. The database 102 can be maintained by the service platform, either on a service platform server or on a remote server.

In some embodiments, the end-user application 100 requests a listing of video content from the database 102 via the web service 106, and the web service 106 then retrieves video metadata from the database 102 before passing that information back to the end-user application 100 to be displayed to a user to select from. In such embodiments, all information necessary for making a video selection, embedding video, and beginning video playback (e.g., including an input URL) is retrieved and made accessible to the controller without initiating any additional requests (e.g., a request comprising a video selection intended to retrieve an input URL) after the initial request for video metadata. In some embodiments, the controller (e.g., code/software making up the controller) resides on service platform servers, not necessarily in, e.g., an end-user application. Information and other data is passed to the controller (e.g., from the database) where it can be used to carry out various steps of the inventive subject matter described in this application.

In some embodiments, to access the database 102, the end-user application 100 sends a video selection request via an internet connection 104 to a web service 106 (e.g., a rest API that facilitates communication between the database 102 and the end-user application 100) that can access the requested information in the database 102, where the web service 106 and the database can exist (as shown in FIG. 1) on the service platform's backend server 110. In some embodiments, the web service 106 is operated by a third party while the database 102 is maintained on service platform server(s), or any combination of the web service 106 and the database 102 being operated/maintained by a third party or by the service platform. The web-service 106 can then send a response back to the end-user application 100, the response including at least an input URL (e.g., a webpage URL, an embed URL, or a video source URL) that the controller 108 can use to initiate video embedding or playback.

There are at least three contemplated possibilities for an input URL, which can lead to embedding or playback of a video in several ways. The input URL can be a webpage URL (e.g., a link to a webpage where a video is embedded), an embed URL (e.g., an embed link from a platform like YouTube), or a video source URL (e.g., a link directly to a video file). A controller of the inventive subject matter can be configured to handle each of those possibilities (using one or any combination of, e.g., PHP, JavaScript, and HTML).

In some embodiments, the controller 108 can have access to a second database 118 that stores, e.g., controller configuration and initialization settings (which can include, e.g., including embedding instructions for each video platform). Configuration and initialization settings can include, for example, information sufficient to allow the controller to recognize input URLs as belonging to particular video platforms that have an available API or SDK, and the controller can then access that API or SDK based on the configuration and initialization settings stored on the second database 118. The term "video platforms," as used in this application, should be interpreted to include any video platform (e.g., YouTube, Vimeo, Facebook), website, or video publisher (e.g., websites that are not necessarily video platforms but that nevertheless publish videos, such as CNN or other media outlets) that makes video content available online. In the absence of a second database 118 storing configuration and initialization settings, one way to update a controller would be to edit the hard coding of the controller, which is impractical and can lead to introduction of bugs. Thus, an advantage of maintaining a second database 118 is that controllers of the inventive subject matter would not need to be hard-code updated each time support for a new website/video sharing platform having an available API or SDK is added to the service platform. Because the second database 118 is not a necessary feature, it is shown as being connected to the controller 108 via a dotted line. In embodiments that do not have a second database 118, controller configuration and initialization settings are stored in the controller 108 itself and updates to these configuration and initialization settings involve updating the controller's source code that must be pushed the service platform, which can result in down time or introduction of bugs that affect the entire service platform. Maintaining a second database 118 can reduce or eliminate these types of problems and improve update efficiency by eliminating the need to revise controller source code just to add support for a new video platform. It is also contemplated that by a service platform administrator can update the second database 118 to add new video platforms via, e.g., a backend user interface that facilitates communication with the second database 118.

Because inclusion of a second database 118 allows for a single update to be pushed to the second database 118 to include new APIs/SDKs for new websites and platforms that can affect all users of the service platform, including the second database 118 can lead to efficiency improvements when it comes to updates because it would eliminate a need to push source code updates to the service platform when all that is really needed is new configuration and initialization settings that each controller can access.

Databases of the inventive subject matter can be populated with video metadata in several ways. In some embodiments, users can browse the internet and then, when they see a video they like, they can add it to the database using, e.g., a browser plugin that pulls metadata associated with that video in to the database, a share button that can share a video directly to the service platform, or by copying a URL and pasting it into the service platform via, for example, an app or the service platform's website. In some embodiments, web crawlers deployed by the service platform can be used to identify video content and then pull video metadata into the database. Both of these methods can be implemented in some embodiments, creating a larger library of video content that users of the service platform can browse through. Each database entry (e.g., each entry corresponding to a video) includes sufficient video metadata to allow users of the service platform to access videos via the service platform. One advantage the service platform confers is that video content hosted elsewhere on the internet can be played back on the service platform with all originally intended advertisements included with the video. This allows video platforms to continue to benefit from viewership that comes via the service platform (e.g., by continuing to collect ad revenue), thus creating an incentive for video platforms to support the service platform. Although database 102 is visually depicted as a single database, it should be understood that an end-user application 100 can access any number of databases to access video metadata stored thereon, whether the database 102 is controlled by the service platform or otherwise.

When a user shares a video to the service platform, the service platform receives that video and proceeds to add the video's metadata to its database. If the server detects that the video is from a new source (e.g., a platform, website, etc.), it can either automatically add configuration and initialization settings for the new source to the controller or to the second database, or it can flag the new source as requiring the controller or the second database to be updated by an administrator of the service platform.

In some embodiments, when a video selection is made, the end-user application 100 creates a video selection request to send to the database 102 via an internet connection 104 and using a web service 106 to retrieve additional information from the database 102. In other embodiments, it is contemplated that the listing of videos sent to the user for display and selection includes sufficient information that an additional video selection request is unnecessary. Instead, when a user makes a selection using the end-user application 100, the controller 108 receives that selection and makes a determination as to how to play the selected video back to the user.

In embodiments where a user makes a video selection and the controller sends a second request for additional video metadata, before an end-user application 100 can send a video selection request, the end-user application 100 must first receive an input from a user, where the input comprises a video selection. To facilitate video selection, the end-user application 100 can display a listing of videos that can be selected by a user. To display this listing, the end-user application 100 retrieves a listing of selectable videos from the database 102 via the web service 106. Once the listing has been retrieved, the end-user application 100 can then display the listing to a user. A listing can include, e.g., text describing each video, a still image from each video, a looping preview video from each video, a series of still images from each video strung together in a repeating animation, the video source, the video format, etc.

The user can then make a selection by providing an input to the end-user application 100. Selections can be made by, for example, tapping on a desired video with a touch screen, clicking on an icon with a mouse using a PC, etc. An example listing is shown in listing 112, showing three videos, each having an associated video title, video description, and a video image play button. It is contemplated that one or any combination of video title, video description, and a video image play button can be displayed to a user without deviating from the inventive subject matter. All that is required is some visual representation of each video (e.g., at least one of an image, text, etc.) that user can interact with to make a video selection. In embodiments where the end-user application 100 retrieves video metadata sufficient to initiate embedding/playback. the user's input amounting to a video selection causes the controller to receive the input URL associated with that video without an additional video selection request being generated and sent to the database 102.

As mentioned above, in some embodiments, video metadata is retrieved from the database 102 before a user makes a video selection. In such embodiments, the end-user application 100 does not need to send a video selection request to retrieve sufficient metadata (e.g., an input URL) to play a video. Instead, the end-user application 100 receives a user's selection and, according to that selection, the end-user application 100 can pass along sufficient information to the controller 108 (e.g., an input URL associated with the selected video) so that the controller 108 can determine how best to present the selected video to the user via the end-user application 100. Thus, a user's video selection can ultimately cause the end-user application 100 to send a playback request comprising at least an input URL to the controller 108, which runs on the service platform, and the controller 108 can then determine how best to display (and ideally, embed) the video on the device running the end-user application.

As shown in FIG. 1, once a video selection is made and video metadata is passed on to or otherwise made available to the controller 108, the controller 108 determines whether the video can be played within the end-user application 100 (see step 114) or if the video should be loaded by opening the webpage where the video can be viewed by visiting a page URL in a web browser (see step 116). In instances where video embedding can be done within the end-user application 100, an iframe (or, e.g., a div section in HTML) or video player is inserted into HTML body code so the video can be presented to the user. In instances where video embedding cannot be done within the end-user application 100, the controller 108 can cause the end-user application 100 to launch a web browser to display the webpage where the video was originally made available for playback (e.g., the webpage where the video was originally embedded). The web browser can be, for example, an in-app browser for mobile, a standalone browser, or it can be a new window or tab in a browser on a computer. In some embodiments, put broadly, when a user makes a video selection, the end-user application checks to see whether a video source entry exists in the database for the selected video, and, if it exists, the video source entry would include either an embed URL or a video source URL, which the controller can then use to embed or playback the selected video. If no video source entry exists for the selected video (or the entry is otherwise invalid), then a webpage URL corresponding to the selected video in the database is sent via callback to the controller. This is discussed in more detail below. In some embodiments, on the other hand, it is contemplated that a webpage URL and either an embed URL or a video source URL (or both) can be passed to the controller, and the controller can then determine which input URL to use in executing steps of the inventive subject matter.

Figure 2:
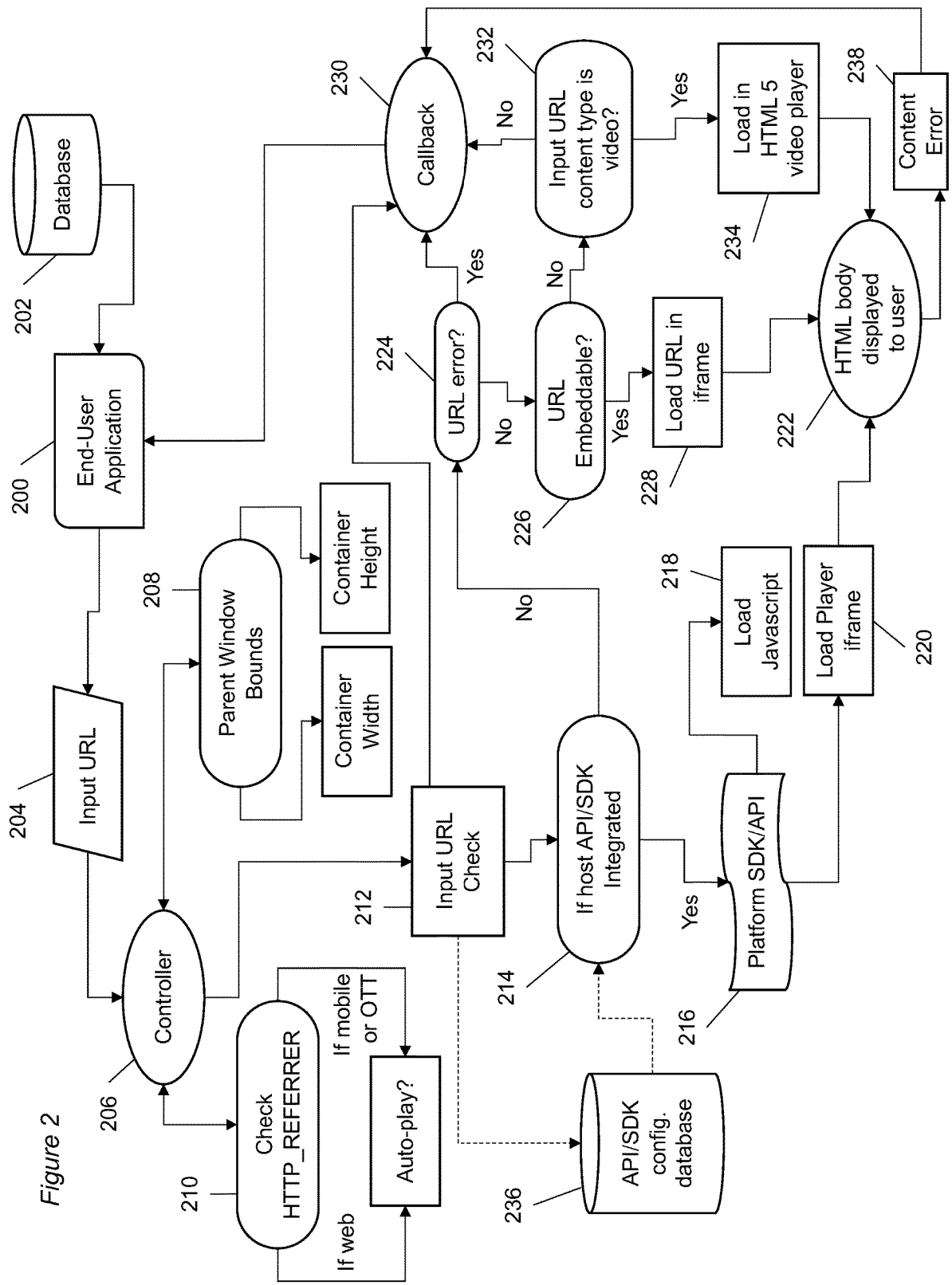
FIG. 2 is a flowchart showing how a controller of the inventive subject matter determines how best to display a selected video.

FIG. 2 is a flowchart showing how a controller of the inventive subject matter can function. Although FIG. 2 is shown as a flowchart, the controller 206 carries out all functions shown flowing from the controller 206, and steps shown flowing from controller 206 do not need to be executed in any particular order unless specified or otherwise required in order for the controller to properly function. A controller in this context is a tool to facilitate video embedding, using input parameters to determine how best to display video content. The controller can be pre-configured to handle one or more different online video platforms (e.g., YouTube, Vimeo, etc.). Input parameters include, for example, an input URL that corresponds to a video. The input URL can be, for example, a webpage URL, an embed URL or a video source URL (e.g., a URL pointing to a video file). When a webpage URL is received by the controller, the controller can determine whether an integrated SDK (software development kit) or API (application protocol interface) exists to play the video back, if there is no API/SDK associated with the URL, then the controller checks if the URL is an embed URL or a video source URL. If the input URL is neither an embed URL nor a video source URL, then the controller can initiate a callback (e.g., to an application) that can result in the original web page the video is embedded on launching in, e.g., a web browser.

As shown in FIG. 2, an end-user application 200 has access to a database 202 (e.g., as also shown and described in FIG. 1) that stores video metadata. Each video entry in the database 202 includes associated video parameters that can include a title, an image, a page URL, a video URL, or any number of other parameters (e.g., runtime, format, resolution, author, etc.). When a user uses the end-user application 200 to select a video, the end-user application 200 retrieves at least an input URL 204 (either from the database or from local storage, as described above) corresponding to the selected video from the database 202, and that input URL 204 is passed along to the controller 206.

When a user selects a video from a video listing using the end-user application 200, an input URL is passed to the service platform. If the input URL points to a video file or the input URL points to a video that cannot be embedded or played back, then then controller 206 executes a callback and the end-user application 200 accesses the input URL (in this case, a webpage URL) by, e.g., opening a web browser to access the input URL, as shown in step 230. The web browser, in some embodiments, can be incorporated into the end-user application 200. Otherwise, when an input URL points to a video platform having an available API/SDK or when the input URL is an embed link or points to a video file, the video can be embedded in the end-user application 200.

Once the controller 206 receives the input URL, it can perform several steps. One of those steps is to determine the parent window bounds 208 (e.g., the bounds of the window into which a video can be embedded). The parent window bounds depend on the way that the service platform is accessed. For example, the parent window bounds can depend at least in part on a device's screen dimensions and on the end-user application's UI design. The video to be embedded in an end-user application 200 can thus scaled according to the parent window bounds so that the end-user application 200 can display the video in the parent window. In some embodiments, a video (e.g., a video in a frame, in a video player, an embedded video, etc.) can have a width that is greater than the parent window width, and when that is the case, the video is scaled (e.g., while maintaining its aspect ratio) so that it fits within the constraining dimension (e.g., the width). In some embodiments, a video (e.g., a video in a frame, in a video player, an embedded video, etc.) can have a height that is greater than the parent window height, and when that is the case, the video is scaled (e.g., while maintaining its aspect ratio) so that it fits within the constraining dimension (e.g., the height). It is contemplated that space left over within the parent window that is unoccupied by an embedded video can be filled in with at least one of a solid color, a pattern, an image, a background, etc. In some embodiments, unoccupied portions of a parent window are filled in to match a background that already exists surrounding the parent window. For example, if the end-user application has a white background, then the unoccupied portions of the parent window are filled in with white, and in another example, unoccupied portions of the parent window can be made transparent so that whatever background exists within the end-user application are visible.

In some embodiments, height and width of a video can be included in the video's metadata that is stored on the service platform-controlled database 202, which can also be retrieved by the end-user application 200 when it retrieves video metadata to create a video listing. In other embodiments, the controller 206 can use the input URL to request video height and width from the video's source (e.g.: if the input URL is a Facebook video URL, then the controller can request video dimensions from Facebook; if the input URL is a YouTube URL, then the controller can request video dimensions from YouTube). Height and width of a video can be used, e.g., by the controller, in conjunction with height and width of the parent window to determine whether and to what extent a video must be scaled so that it fits into the parent window.

As mentioned above, three types of input URLs are contemplated: a webpage URL, an embed URL, and a video source URL. Any type of input URL can be used when a video platform (e.g., the platform maintaining the database storing the video content indicated by the webpage URL) has an integrated SDK (software development kit) or API (application protocol interface). An embed URL or webpage URL can be used when the platform (e.g., the platform maintaining the database storing the video content indicated by the video source URL) storing the video content does not have an SDK or API, and the controller can execute a callback to cause the end-user application to access a webpage URL (e.g., by opening a web browser, etc.) if the controller fails to embed the video using the embed URL or a video source URL.

In some embodiments, another step is for the controller to determine whether to initiate auto-play of a video. To do this, the controller checks the HTTP referrer in step 210. In this step, the controller 206 checks what type of system is accessing the input URL (e.g., by a web browser on a computer, by an OTT system, or by an application on a mobile device, etc.). If the input URL is being accessed by, e.g., a mobile device (such as a tablet, a cell phone, a smart home hub, etc.) running an app, then the controller can cause the video to auto-play, and if the input URL is being access via, e.g., a website or OTT system, then the controller can cause the video not to auto-play. Whether to auto-play can also depend on each particular user's preferences (e.g., a user can select whether video content should be auto-played, regardless of how that user accesses the video content).

Another step for the controller is to check the input URL 212 (e.g., determine the host of the input URL to determine how best to play a video back). In some embodiments, to check the input URL, the controller 206 checks the domain of the input URL. Generally, a video's host can be determined by a domain in the URL (e.g., youtube.com or youtu.be would indicate that YouTube is the video source). Once the controller 206 has determined a video's source, it can determine how that video must be played back. The controller 206 can, based on the determined video source, use the video source's API or SDK to embed and playback the video via the end-user application 200. In instances where no API or SDK exists to embed and playback the video, then playback can be initiated using, e.g., an iframe (for embed URLs), HTML5 (for video source URLs), or similar.

Thus, after checking the input URL, the controller 206 then determines if an API or SDK exists that can facilitate video embedding and playback 214. Controllers of the inventive subject matter can be initialized to handle videos from many difference sources. For example, to embed and playback a YouTube video using YouTube's API, the controller must be initialized so that, upon detecting that an input URL points to a YouTube video, the controller knows to access YouTube's API to play the video back. Controllers of the inventive subject matter can be configured to have any number of websites and video sources (e.g., video platforms) initialized in this way, so that any time an input URL from an initialized website is received, the controller knows how to play it back. Thus, if the input URL points to a video on a platform that has been initialized in the controller, then the controller uses that platform's API or SDK as shown in step 216. The controller then loads JavaScript (step 218), the JavaScript loads an iframe or player that the API/SDK (step 220) so that the video can be played back by inserting the iframe into HTML body code that presents the video to a user (step 222) via the end-user application 200. The height and width of the iframe loaded in step 220 are affected by the parent window bounds determined in in step 208.

As described above, controller 206 (and, e.g., any other instance of a controller running in an app or website when a client accesses the service platform) can be coupled with a second database 236, where the second database 236 (e.g., the API/SDK configuration database) stores configuration and initialization settings that the controller can access in the course of determining whether an API/SDK exists for a video pointed to by a particular input URL 204. The second database 236 is shown with dotted lines since it represents an alternative embodiment of the inventive subject matter. When the controller 206 reaches the step of checking the input URL 212, it can then access the second database 236 in determining whether there is an available API or SDK (as opposed to checking locally stored configuration and initialization settings) before moving to the next step. All disclosure written above with regard to the second database in FIG. 1 applies equally to the second database 236 shown in FIG. 2.

In some embodiments, the step of checking the input URL further includes checking whether the video platform associated with the input URL exists on a prohibited list (e.g., a list of video platforms that either prohibit embedding or are identified as being prohibitive of embedding) maintained on the configuration database 236. In instances where the input URL is associated with a video platform that is included on such a prohibited list, then the controller can initiate a callback (step 230) to cause the end-user application 200 to open a web browser to access the input URL. The prohibited list can be maintained on the configuration database 236 or on any other database accessible to the service platform.

On the other hand, if the controller receives an input URL that corresponds to a domain or platform that is not initialized in the controller 206, then the controller first determines whether an error is returned upon attempting to access the URL (step 224). If an error (e.g., a 404 error indicating the client device was able to communicate with a given server, but the server could not find what was requested) or any other error whereby the client either cannot reach or communicate with the server at all, or the server indicates the client's request could not be fulfilled (e.g., a cross-domain or cross-origin related error or issue resulting from an attempt to make a connection to a server that is normally only allowed when the connection attempt is made to the same domain that the page was served from), then the controller 206 executes a callback 230 to the end-user application 200 indicating that the video is not playable. When the controller 206 executes a callback, the end-user application 200 accesses the input URL (in this case, a webpage URL) by, e.g., opening a web browser to load a webpage where the video is embedded.

If, on the other hand, step 224 does not reveal a URL error that would interfere with video embedding, the controller 206 then checks whether the input URL points to embeddable content 226. If the URL points to video content that is embeddable (e.g., a Vimeo embed link/HTML code), then the controller loads the video into an iframe and subsequently loads that iframe into HTML body. If the URL is not embeddable and the input URL does not point to a video (step 232) (e.g., the URL page content type is not video) then the controller 206 can do a callback to the end-user application 200, so the end-user application 200 can open a browser window (e.g., a new window or tab if user has accessed the service platform from a website) to access the input URL (e.g., in this case, the input URL is a webpage URL).

But if the input URL is not embeddable and the input URL nevertheless points to a video (e.g., the URL page content type is video and the URL points to a video file, for example, a .mov, a .mp4, a .flv, etc. file), then the controller 206 can load the video file in a video player (step 234) (e.g., an HTML5 video player or the like). The controller 206 then puts that video player into HTML body code so that it can be displayed to the user (step 222).

In some instances, step 222 can be reached without any errors only to encounter a content error that prevents the video from being embedded or played back (e.g., the video platform that the selected video belongs to has prevented embedding). When a content error 238 is encountered after reaching step 222, a callback 230 can be executed to cause the end-user application 200 to open the input URL (e.g., a webpage URL or the like) in. e.g., a web browser. Content errors can arise for a variety of reasons. For example, a content error can arise when an API has flagged a video as not being embeddable or when the video simply does not load, or, in other instances, a content error can result from a cross-domain or cross-origin related error as described above. Any type of input URL can yield content errors.

Thus, specific systems and methods of facilitating video embedding from any third-party platform or source have been disclosed. It should be apparent, however, to those skilled in the art that many more modifications besides those already described are possible without departing from the inventive concepts in this application. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A method of embedding online videos from multiple sources comprising:
   storing, in a database on a server, video metadata associated with a video stored on a remote server, wherein the video metadata comprises an input Uniform Resource Locator (URL) that points to the video;
   sending, to a client, a video listing comprising the video metadata;
   receiving, at the server, a video selection from the client, the video selection comprising the input URL;
   determining, by the server, a video platform corresponding to the input URL;
   determining, by the server and according to the video platform, whether to embed the video according to embedding instructions associated with the video platform; and
   determining, by the server, whether the video platform has an associated Application Programming Interface (API) or software development kit (SDK).

2. The method of claim 1, further comprising the step of loading the video into a frame and inserting the frame into HTML body code to be rendered for playback by the client using the associated API or SDK.

3. The method of claim 1, further comprising the step of executing a callback so the client can open the input URL in a web browser.

4. The method of claim 1, further comprising the step of using the input URL to embed the video, wherein the input URL comprises an embed URL.

5. The method of claim 1, further comprising the step of loading the video in an HyperText Markup Language 5 (HTML5) player and inserting that player into the HTML body to be rendered for playback by the client.

6. The method of claim 1, wherein the step of determining the video platform comprises identifying a platform associated with the input URL.

7. The method of claim 6, wherein identifying the video platform comprises identifying a domain in the input URL that is associated with the video platform.

8. The method of claim 1, further comprising the step of testing the input URL for a URL error.

9. The method of claim 8, further comprising the step of executing a callback so the client can open the input URL in a web browser.

10. The method of claim 1, further comprising the step of determining whether the video platform exists on a prohibited list.

11. The method of claim 1, further comprising the steps of:
    receiving a content error; and
    executing a callback.

12. A universal online video embedding system comprising:
    a server having executable code stored to internal memory, the executable code configured to, upon execution, cause the server to:
    store, in a database on the server, video metadata associated with a video stored on a remote server, wherein the video metadata comprises an input Uniform Resource Locator (URL) that points to the video;
    send, to a client, a video listing comprising the video metadata;
    receive a video selection from the client, the video selection comprising the input URL;
    determine a video platform corresponding to the input URL;
    determine, based on the video platform, whether the video platform has an associated Application Programming Interface (API) or software development kit (SDK) before loading the video into a frame and inserting the frame into HyperText Markup Language (HTML) body code to be rendered for playback by the client using the associated API or SDK; and
    determine, based on the input URL, whether the video is embeddable before either (1) loading the video in an HTML5 player and inserting that player into the HTML body to be rendered for playback by the client or (2) loading the video in a second frame and inserting the second frame into HTML body to be rendered for playback by the client.

13. The system of claim 12, wherein the executable code is further configured to cause the server to determine the video platform by identifying a platform associated with the input URL.

14. The system of claim 13, wherein the executable code is further configured to cause the server to identify the video platform by identifying a domain in the input URL that is associated with the video platform.

15. The system of claim 12, wherein the executable code is further configured to cause the server to test the input URL for a URL error.

16. The system of claim 15, wherein the executable code is further configured to cause the server to execute a callback so the client can open the input URL in a web browser.

17. The system of claim 12, wherein the executable code is further configured to cause the server to execute a callback upon receiving a content error.

18. The system of claim 12, wherein the executable code is further configured to cause the server to determine whether the video platform exists on a prohibited list.

19. A method of embedding online videos from multiple sources comprising:
    storing, in a database on the server, video metadata associated with a video stored on a remote server, wherein the video metadata comprises an input Uniform Resource Locator (URL) that points to the video;
    sending, to a client, a video listing comprising the video metadata;
    receiving a video selection from the client, the video selection comprising the input URL;
    determining a video platform corresponding to the input URL; and
    executing software code stored to internal memory on the server to configure the server to:
        determine, based on the video platform, whether the video platform has an associated Application Programming Interface (API) or software development kit (SDK) before loading the video into a frame and inserting the frame into HyperText Markup Language (HTML) body code to be rendered for playback by the client using the associated API or SDK;
        determine, based on the input URL, whether the video is embeddable before either (1) loading the video in an HTML5 player and inserting that player into the HTML body to be rendered for playback by the client or (2) loading the video in a second frame and inserting the second frame into HTML body to be rendered for playback by the client.

20. The method of claim 19, further comprising the step of determining the video platform by identifying a platform associated with the input URL.

21. The method of claim 20, further comprising the step of identifying the video platform by identifying a domain in the input URL that is associated with the video platform.

22. The method of claim 19, further comprising the step of testing the input URL for a URL error.

23. The method of claim 22, further comprising the step of executing a callback so the client can open the input URL in a web browser.

24. The method of claim 19, further comprising the steps of:
    receiving a content error; and
    executing a callback.

25. The method of claim 19, further comprising the step of determining whether the video platform exists on a prohibited list.

* * * * *